(12) United States Patent
Topp et al.

(10) Patent No.: US 9,158,705 B2
(45) Date of Patent: Oct. 13, 2015

(54) STRIDE-BASED TRANSLATION LOOKASIDE BUFFER (TLB) PREFETCHING WITH ADAPTIVE OFFSET

(71) Applicants: Jaroslaw Topp, Schoeppenstedt (DE); Pedro Lopez, Molins de Rei (ES); Fernando Latorre, Barcelona (ES); Demos Pavlou, Barcelona (ES); Thang Vu, Barsbuettel (DE)

(72) Inventors: Jaroslaw Topp, Schoeppenstedt (DE); Pedro Lopez, Molins de Rei (ES); Fernando Latorre, Barcelona (ES); Demos Pavlou, Barcelona (ES); Thang Vu, Barsbuettel (DE)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 13/799,582

(22) Filed: Mar. 13, 2013

(65) Prior Publication Data

US 2014/0281351 A1 Sep. 18, 2014

(51) Int. Cl.
*G06F 12/00* (2006.01)
*G06F 12/10* (2006.01)
*G06F 12/08* (2006.01)

(52) U.S. Cl.
CPC ........ *G06F 12/1027* (2013.01); *G06F 12/0862* (2013.01); *G06F 2212/602* (2013.01)

(58) Field of Classification Search
CPC ............ G06F 12/0862; G06F 12/1027; G06F 2212/602
See application file for complete search history.

(56) References Cited

U.S. PATENT DOCUMENTS

2006/0248279 A1* 11/2006 Al-Sukhni et al. ............ 711/137
2014/0108766 A1* 4/2014 Desai ............................ 711/205
2014/0149632 A1* 5/2014 Kannan et al. .................... 711/3

\* cited by examiner

*Primary Examiner* — Edward Dudek, Jr.
(74) *Attorney, Agent, or Firm* — Lowenstein Sandler LLP

(57) ABSTRACT

A processing device implementing stride-based translation lookaside buffer (TLB) prefetching with adaptive offset is disclosed. A processing device of the disclosure includes a data prefetcher to generate a data prefetch address based on a linear address, a stride, or a prefetch distance, the data prefetch address associated with a data prefetch request, and a TLB prefetch address computation component to generate a TLB prefetch address based on the linear address, the stride, the prefetch distance, or an adaptive offset. The processing device also includes a cross page detection component to determine that the data prefetch address or the TLB prefetch address cross a page boundary associated with the linear address, and cause a TLB prefetch request to be written to a TLB request queue, the TLB prefetch request for translation of an address of a linear page number (LPN) based on the data prefetch address or the TLB prefetch address.

24 Claims, 9 Drawing Sheets

US 9,158,705 B2

STRIDE-BASED TRANSLATION LOOKASIDE BUFFER (TLB) PREFETCHING WITH ADAPTIVE OFFSET

TECHNICAL FIELD

The embodiments of the disclosure relate generally to processing devices and, more specifically, relate to stride-based translation lookaside buffer (TLB) prefetching with adaptive offset.

BACKGROUND

Data prefetching, or early fetching of data into a cache, is a feature implemented in a processor to augment a probability of having requested data in a timely manner and thereby maintain a high processing efficiency. When the data is available at a first cache level, a number of cycles where the processor stalls may be reduced. For example, a processor may stall when waiting for data to come back from more distant (with respect to the processor) cache levels or memory.

Currently, many data prefetchers in modern state-of-the art processors work within page boundaries. Every prefetch request that crosses a page boundary is dropped by the data prefetcher. This is because every time the processor crosses the page boundary, it should guarantee it can obtain a translation from virtual to physical addresses. The translation lookaside buffer (TLB) may not always have the address translation and the data prefetcher cannot access the TLB to obtain the address translation. As a result, a data prefetcher may be very aggressive in making data requests in advance of next addresses, but if it crosses a page boundary, it cannot generate that request because it does not have the physical translation. As the accuracy of data prefetchers increases, this inability to move beyond page boundaries can result in processor latency and performance setbacks.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
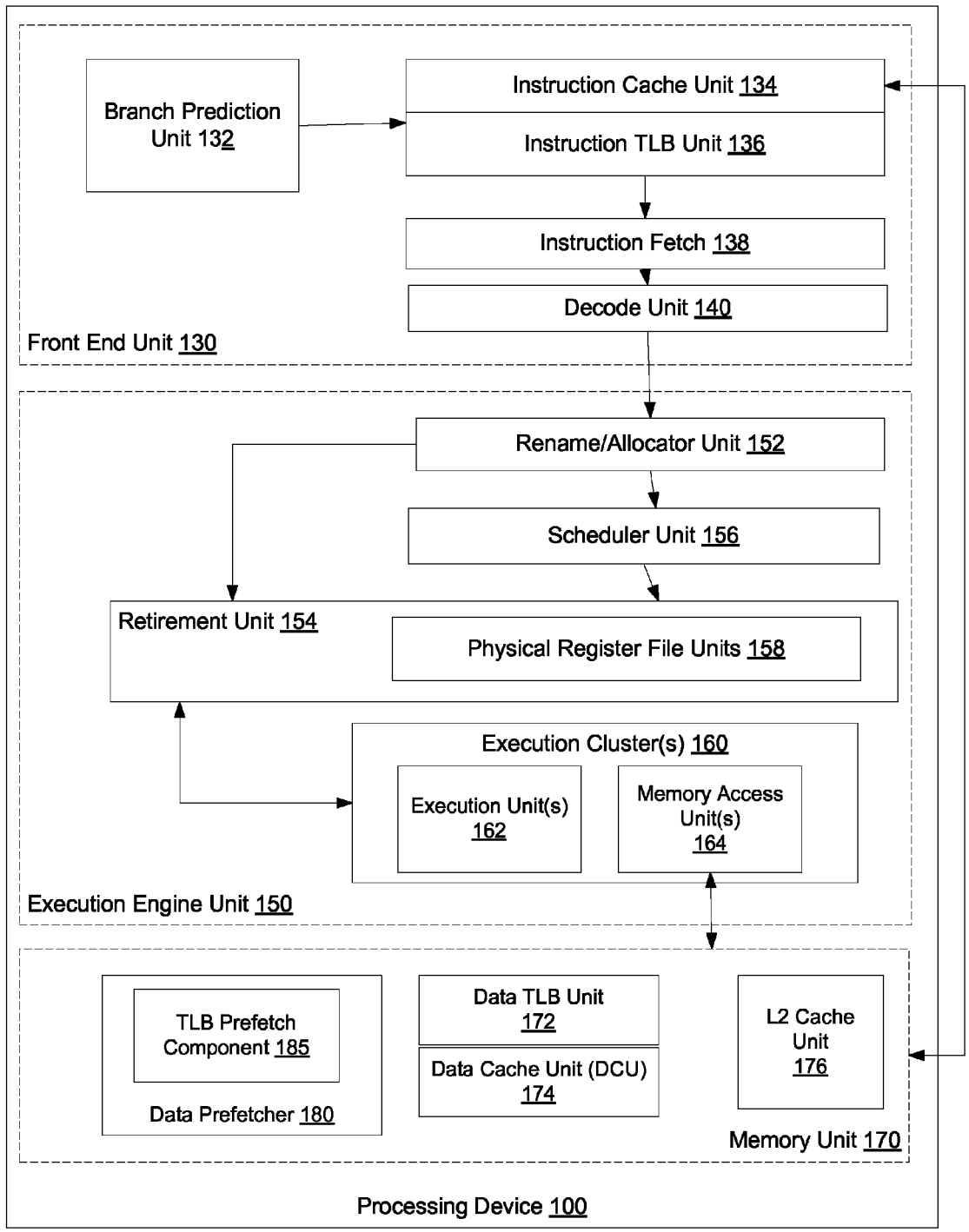
FIG. 1A is a block diagram of a micro-architecture for a processor that implements stride-based TLB prefetching with adaptive offset in which at least one embodiment may be used.

Embodiments of the disclosure provide stride-based translation lookaside buffer (TLB) prefetching with adaptive offset. In one embodiment, a TLB prefetch component generates TLB prefetches ahead of data prefetches to increase a TLB hit rate and allow data prefetchers to increase their prefetch distance and, therefore, reduce the number of cache misses. The TLB prefetch component of embodiments of the invention adapts to data prefetch conditions as they occur, and identifies situations where the TLB prefetcher arrives too late and delays the data prefetcher. In this case, the TLB prefetch component adjusts its aggressiveness to prevent the same situation in the future.

Previously, data prefetchers would drop a data prefetch request if the request crossed a page boundary. Embodiments of the invention send a TLB prefetch request to the TLB ahead of pending data prefetch requests. As a result, the data prefetcher no longer has to drop data prefetch requests that cross page boundaries. An advantage of this technique over previous solutions includes reducing TLB misses, as most of the prefetched TLB translations are consumed by future instructions (due to current implementations of data prefetchers having high prediction accuracy). Another advantage of embodiments of the invention over previous solution is the reduction of data cache misses. This is because any data prefetch requests that cross a page boundary are no longer dropped, so more data cache lines are prefetched ahead of the consuming instruction; thus decreasing the cache miss rate.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1A is a block diagram illustrating a micro-architecture for a processor 100 that implements stride-based TLB prefetching with adaptive offset in which one embodiment of the disclosure may be used. Specifically, processor 100 depicts an in-order architecture core and a register renaming logic, out-of-order issue/execution logic to be included in a processor according to at least one embodiment of the invention.

Processor 100 includes a front end unit 130 coupled to an execution engine unit 150, and both are coupled to a memory unit 170. The processor 100 may include a reduced instruction set computing (RISC) core, a complex instruction set computing (CISC) core, a very long instruction word (VLIW) core, or a hybrid or alternative core type. As yet another option, processor 100 may include a special-purpose core, such as, for example, a network or communication core, compression engine, graphics core, or the like. In one embodiment, processor 100 may be a multi-core processor or may part of a multi-processor system, such as system 600 described further below with respect to FIG. 1B.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 134 is further coupled to the memory unit 170. The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations (RS), central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 158 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which may include a data prefetcher 180, a data TLB unit 172, a data cache unit (DCU) 174, and a level 2 (L2) cache unit 176, to name a few examples. In some embodiments DCU 174 is also known as a first level data cache (L1 cache). The DCU 174 may handle multiple outstanding cache misses and continue to service incoming stores and loads. It also supports maintaining cache coherency. The data TLB unit 172 is a cache used to improve virtual address translation speed by mapping virtual and physical address spaces. In one exemplary embodiment, the memory access units 164 may include a load unit, a store address unit, and a store data unit, each of which is coupled to the data TLB unit 172 in the memory unit 170. The L2 cache unit 176 may be coupled to one or more other levels of cache and eventually to a main memory.

In one embodiment, the data prefetcher 180 speculatively loads/prefetches data to the DCU 174 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

Data prefetching may be used beneficially to improve cache performance. The data prefetcher 180 may analyze memory operation information to detect patterns in the execution of memory operations. In some embodiments, detected patterns are used to predict information about subsequent memory operations in order to prefetch the data corresponding to the predicted memory operations.

In one embodiment, a TLB prefetch component 185 is embedded in the data prefetcher 180. The TLB prefetch component 185 may generate TLB prefetches ahead of data prefetches to increase TLB hit rate and to allow the data prefetcher 180 to increase its prefetch distance without having to drop prefetch requests when crossing page boundaries. The TLB prefetch component 185 may be implemented in hardware, software, firmware, or any combination of the above. In some embodiments, the TLB prefetcher 185 adapts to the conditions of the data prefetcher 180 and identifies situations where a TLB prefetch arrives too late and delays the data prefetcher 180. In this case, the TLB prefetcher 185 adjusts its aggressiveness to prevent the same situation in the future. Additional description and details of the TLB prefetcher 185 is provided below with respect to FIG. 2 below.

The processor 100 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 1B:
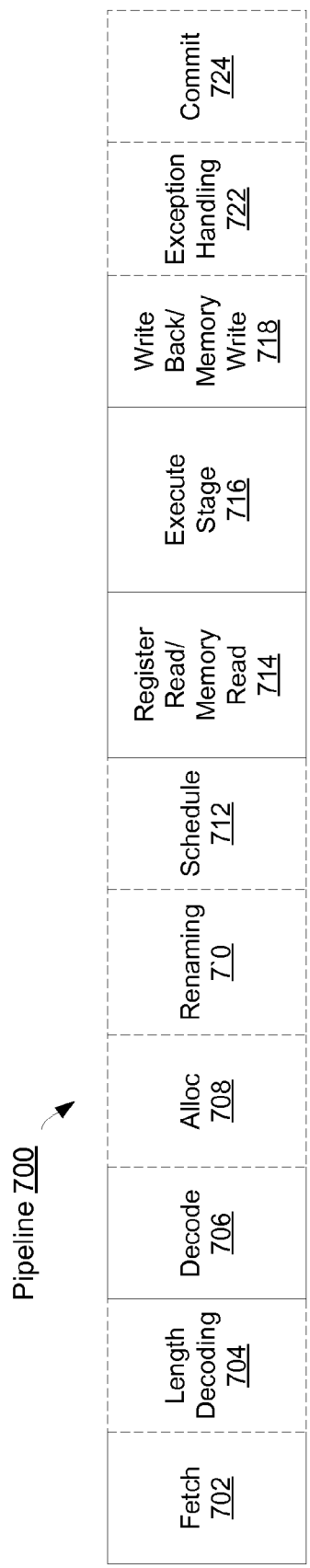
FIG. 1B illustrates elements of a processor micro-architecture according to one embodiment.

FIG. 1B is a block diagram illustrating an in-order pipeline and a register renaming stage, out-of-order issue/execution pipeline implemented by processing device 100 of FIG. 1 according to at least one embodiment of the invention. The solid lined boxes in FIG. 1B illustrate an in-order pipeline, while the dashed lined boxes illustrates an register renaming, out-of-order issue/execution pipeline. In FIG. 1B, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

Figure 1C:
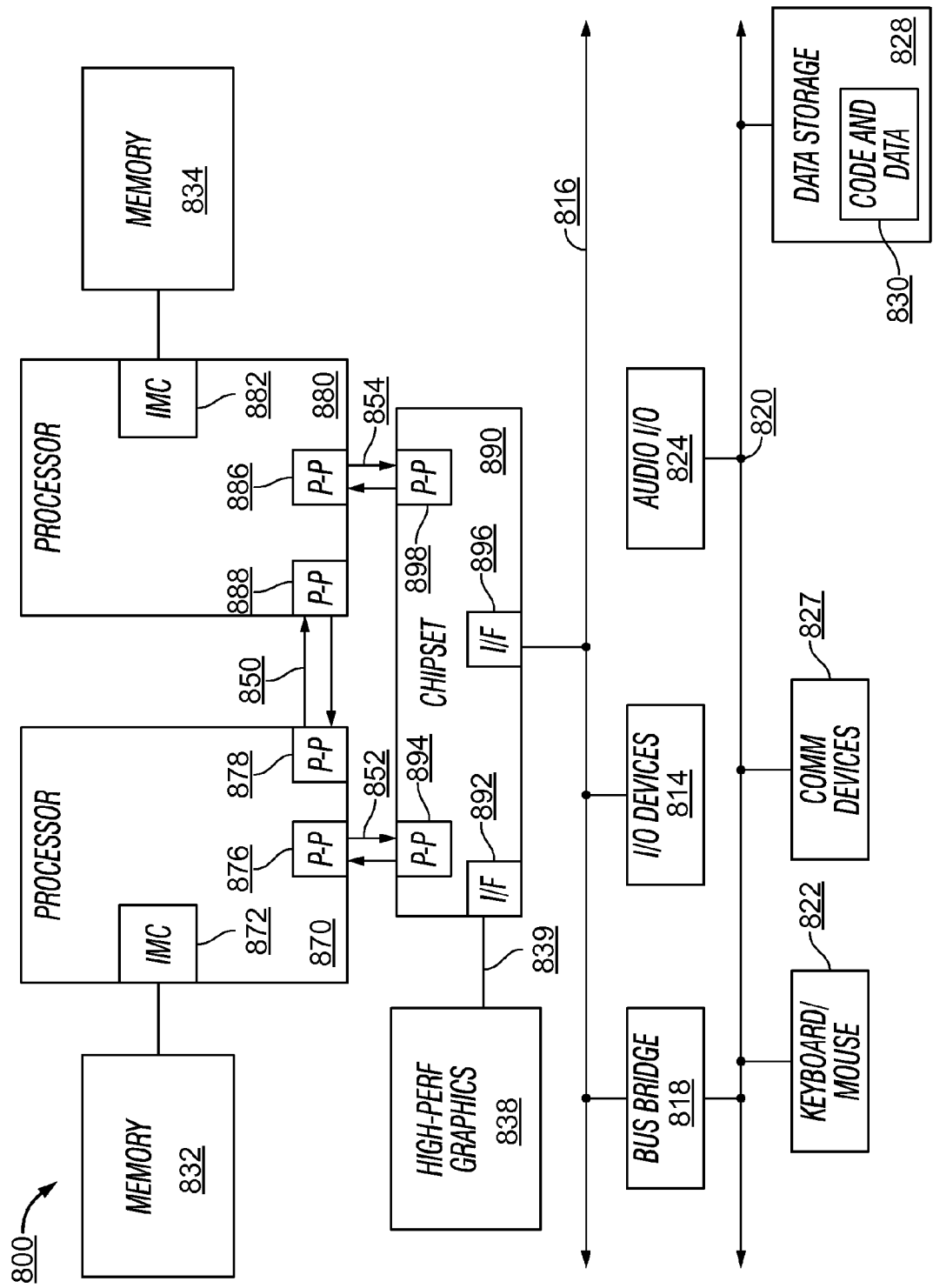
FIG. 1C is a block diagram of a computer system in which at least one embodiment may be used.

Referring now to FIG. 1C, shown is a block diagram illustrating a system 800 in which an embodiment of the disclosure may be used. As shown in FIG. 1C, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the invention is not so limited. In other embodiments, one or more additional processors may be present in a given processor. In one embodiment, the multiprocessor system 800 may implement stride-based TLB prefetching with adaptive offset as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 1C, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 1C, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 1C, a system may implement a multi-drop bus or other such architecture.

Figure 2:
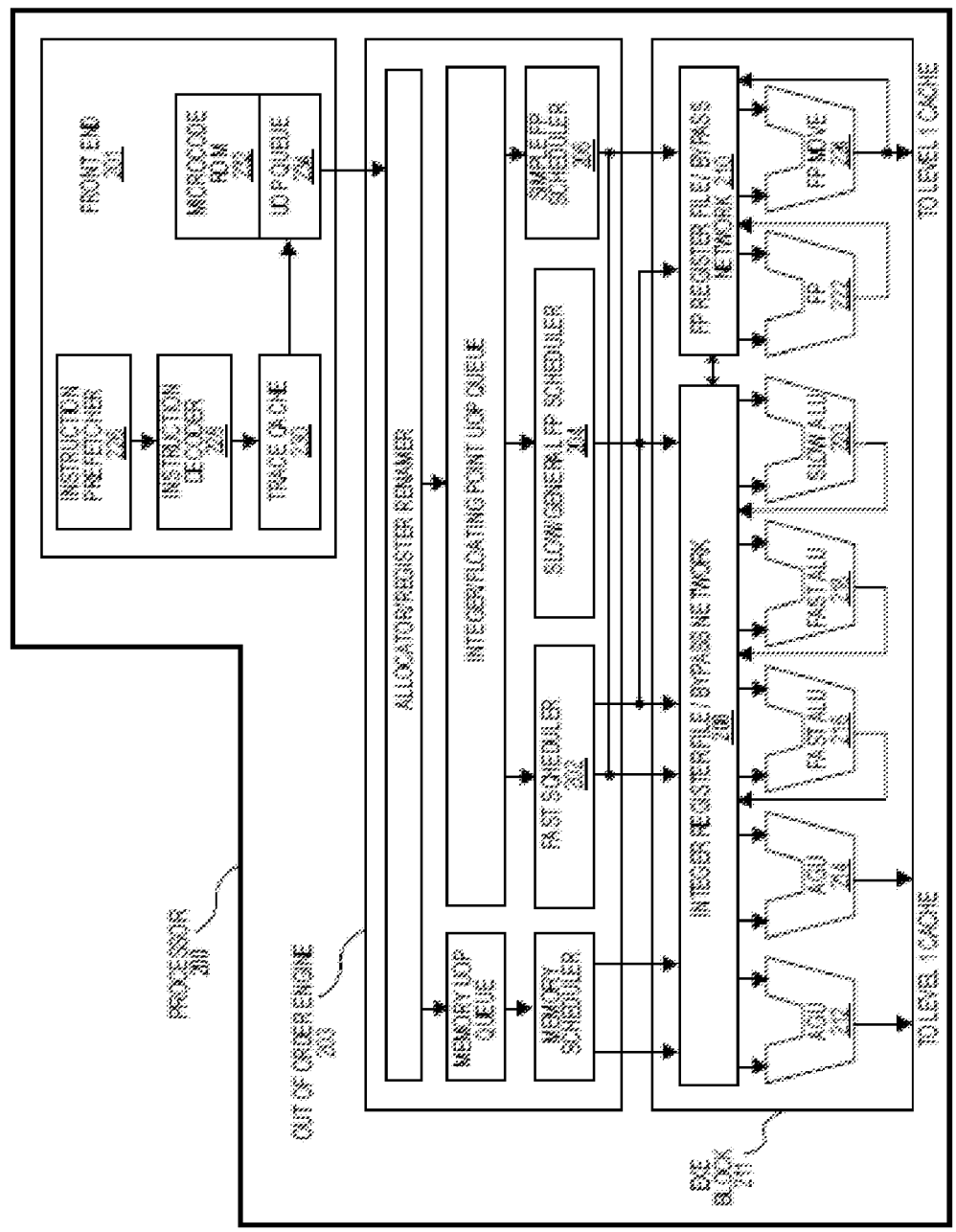
FIG. 2 is a block diagram illustrating a processor according to one embodiment in which at least one embodiment may be used.

FIG. 2 illustrates a block diagram of the micro-architecture for a processor 200 that includes logic circuits to perform stride-based TLB prefetching with adaptive offset in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 200 also includes logic to implement stride-based TLB prefetching with adaptive offset according to embodiments of the invention. As uops are speculatively scheduled and executed in processor 200, the processor 200 may utilize this logic in conjunction with a data prefetcher in order in order to speculative prefetch data needed for the operations, and perform TLB lookups for the data prefetches.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
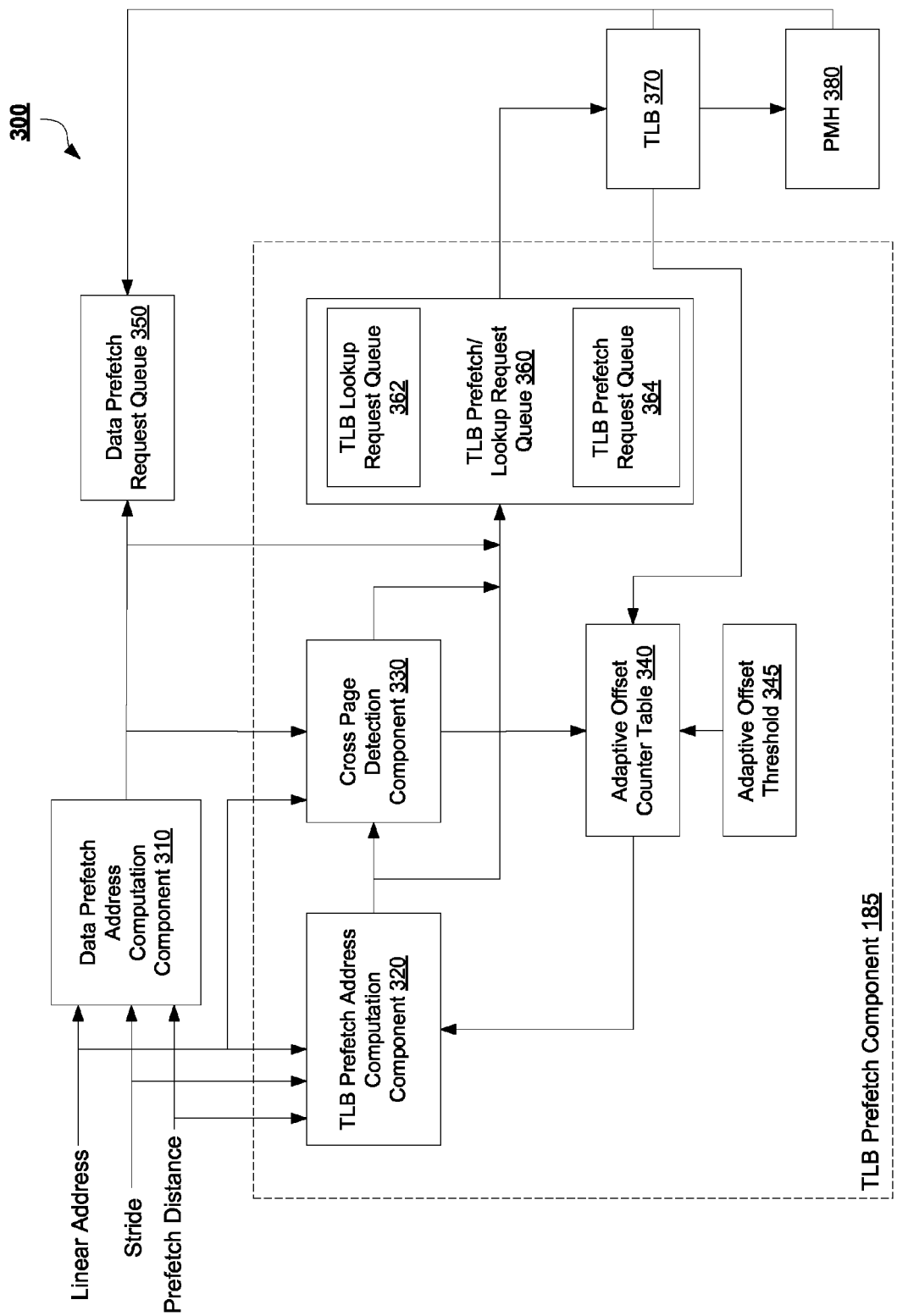
FIG. 3 is a block diagram illustrating a memory management system implementing stride-based translation lookaside buffer (TLB) prefetching with adaptive offset according to embodiments of the disclosure.

FIG. 3 is a block diagram illustrating a memory management system 300 implementing stride-based TLB prefetching with adaptive offset in which embodiments of the disclosure may be used. System 300 may include the TLB prefetch component 185 from FIG. 1 operating in conjunction with a prefetch address computation component 310, a data prefetch queue 350, a TLB 370, and a page miss handler (PMH) 380.

The TLB prefetch component 185 may include a TLB prefetch address computation component 320, a cross page detection component 330, a TLB prefetch/lookup request queue 360, an adaptive offset table 340, and an adaptive offset threshold 345. In embodiments of the invention, the components of system 300 may be implemented in hardware, software, firmware, or any combination of the above.

In one embodiment, a data prefetcher, such as data prefetcher 180 of FIG. 1, may be trained and a resulting memory access pattern is detected. At this point, a stride may be calculated that represents a fixed memory address offset between successive memory operations. In some embodiments data prefetcher 180 may be a type of data prefetcher that does not compute stride. In such an implementation, embodiments of the TLB prefetch component 185 may utilize another data prediction value in place of the stride value. In addition, a prefetch distance is determined that represents a number of memory references ahead, in a stream of upcoming demanded memory references to be made by a program, that a prefetch request is made. The stride and prefetch distance are passed, along with a linear address representing a current memory reference of the program, to both of the data prefetch address computation component 310 and the TLB prefetch address computation component 320. The data prefetch address computation component 310 calculates a data prefetch offset in parallel with the TLB prefetch address computation component calculating a TLB prefetch offset. These offsets are added to the linear address to provide the data prefetch address and the TLB prefetch address.

In one embodiment, the data prefetch address is calculated as follows: pref_addr=lin_addr+(stride*pref_dist), where pref_addr is the data prefetch offset, lin_addr is the linear address, and pref_dist is the prefetch distance.

In another embodiment, the TLB prefetch offset is calculated as follows: TLB_pref_addr=lin_addr+(stride* (pref_dist+adap_offset)), where the TLB_pref_Addr is the TLB prefetch offset, and adap_offset is the adaptive offset applied by the TLB prefetch component 185. Further details of the adaptive offset are discussed later below.

After the data prefetch address and TLB prefetch address calculations are made, these addresses are passed to the cross page detection component 330. In one embodiment, cross page detection logic 330 determines whether either of two prefetch conditions occurs. The first prefetch condition occurs when the TLB prefetch address crosses a page boundary for the first time with respect to the linear address. The second prefetch condition occurs when the data prefetch address crosses a page boundary for the first time with respect to the linear address. If either prefetch condition occurs, the cross page boundary sets a cross page flag to indicate that TLB prefetch request should be made, as discussed further below. In one embodiment, the second prefetch condition has priority over the first prefetch condition, so that if both conditions are found, the operations associated with the second prefetch condition are performed.

To determine whether the first prefetch condition (TLB prefetch address crosses page boundary) occurs, the cross page detection component 330 compares the linear address to the TLB prefetch address. For example, in the case of a 4 KB memory page, the cross page detection component 330 may determine whether linear_addr[12]!=tlb_pref_addr[12], which determines whether the $13^{th}$ least significant bit of each of the linear address and the TLB prefetch address are the same. For the 4 KB memory page, the lower 12 bits represent the offset of an address within a page. As a result, it is the $13^{th}$ least significant bit (i.e., [12]) indicates whether there is a difference in pages between two linear addresses. Other pages sizes may also be used with embodiments of the invention, and different comparison techniques may be implemented for each memory page size, as appropriate. If the comparison is not equal, then a page cross boundary occurs between the two addresses.

When the first prefetch condition is determined to occur, the cross page detection logic may set a first cross page flag that specifically indicates that the first prefetch condition is valid. This first cross page flag may cause the calculated TLB prefetch address to be passed from the TLB prefetch address computation component 320 to a TLB prefetch request queue 364 of the TLB prefetch/lookup request queue 360. In one embodiment, the TLB prefetch request queue 364 is implemented as staging latches.

In one embodiment, a new linear page number (LPN) is generated from the TLB prefetch address for storage in the TLB prefetch request queue 364 along with the TLB prefetch request. In one example, the new LPN is concatenated as follows: LPN[0]=tlb_prefetch_addr[12], LPN[35:1]=linear_addr[47:13]. Various address widths may be utilized depending on the particular computer architecture implementation, and the above example is not limiting to embodiments of the invention. A TLB prefetch request is generated and written along with the new LPN into the TLB prefetch request queue 364, if there is no previous entry in TLB prefetch request queue 364 requesting the same LPN translation already. The TLB prefetch request queue 364 should hold all information used for arbitration and dispatching of a prefetch request to the TLB 370.

The second prefetch condition may occur when the data prefetch address crosses a page boundary due to, for example, a race condition or before a TLB prefetch for the page has resolved. If this happens, the data prefetch requests are not dropped, but are instead allocated in the data prefetch request queue 350. To determine whether the second prefetch condition occurs, the cross page detection component 330 compares the linear address to the data prefetch address. For example, the cross page detection component 330 may determine whether linear_addr[12]!=data_pref_addr[12], which determines whether the 13$^{th}$ least significant bit of each of the linear address and the data prefetch address are the same. If the comparison is not equal, then a page cross boundary occurs between the two addresses.

When the second prefetch condition is determined to occur, the cross page detection logic may set a second cross page flag that specifically indicates that the second prefetch condition is valid. This second cross page flag may cause the calculated data prefetch address to be passed from the data prefetch address computation component 310 to a TLB lookup request queue 362 of the TLB prefetch/lookup request queue 360. In one embodiment, the TLB lookup request queue 362 is implemented as staging latches.

In one embodiment, a new linear page number (LPN) is generated from the data prefetch address for storage in the TLB lookup request queue 362 along with the TLB prefetch request. In one example, the new LPN is concatenated as follows: LPN[0]=data_prefetch_addr[12], LPN[35:1]=linear_addr[47:13]. A TLB prefetch request is generated and written along with the new LPN into the TLB lookup request queue 364, if there is no previous entry in TLB lookup request queue 362 requesting the same LPN translation already. The TLB lookup request queue 362 should hold all information used for arbitration and dispatching of a prefetch request to the TLB 370.

In embodiments of the invention, both of the TLB prefetch request queue 364 and the TLB lookup request queue 362 hold the same information, namely TLB prefetch requests for a linear page number. Both queues 362, 364 may take part in the arbitration as a lowest priority dispatch agent, however the dispatch of the TLB lookup request queue 362 requests may have higher priority than the TLB prefetch request queue 364. This is because, in the case of the second prefetch condition (data prefetch request crossing a page boundary), there are data prefetch requests allocated in the data prefetch request queue 350 that are waiting for the physical page number (PPN) (e.g., PPN=physical_address[38:12]). However, in some embodiments, a single TLB prefetch/lookup request queue 360 may be implemented, with prioritization mechanisms utilized within to differentiate between requests resulting from the first prefetch condition or the second prefetch condition.

Requests from both queues 362, 364 (TLB prefetch and TLB lookup) access the TLB 370. In the case of a TLB miss, the prefetch requests trigger a PMH 380 that performs a page table walk to locate the address translation. When the TLB 370 hits or the miss is resolved by the PMH 380, the PPN is updated in data prefetch request queue 350. In case of a page fault or when the PPN is not delivered on time, the data prefetch request queue may overflow.

In one embodiment, the TLB offset calculation may be adaptive to respond to runtime conditions experienced by the data prefetcher, such as the TLB prefetch component 185 being unable to detect a page boundary cross ahead of the data prefetch request. When this occurs, it is an indicator that the TLB offset is not large enough. To adjust to this inefficient speculation, an adaptive offset may be utilized to adjust the TLB offset based on runtime conditions experience during operation of the data prefetcher and TLB prefetch component 185. Every time the second prefetch condition occurs, a counter is incremented at the adaptive offset counter table 340. If the value of this counter 340 exceeds an adaptive offset threshold 345, the adaptive offset (adap_offset) is incremented. In one embodiment, the adaptive offset is increment up to a limit, in order to avoid crossing more than one page boundary. In some embodiment, the adaptive offset threshold and limit may be configured by a system administrator and programmable in software. In one embodiment, the adaptive offset is incremented by multiples of the constant stride value, as indicated in the formula provided above.

Figure 4:
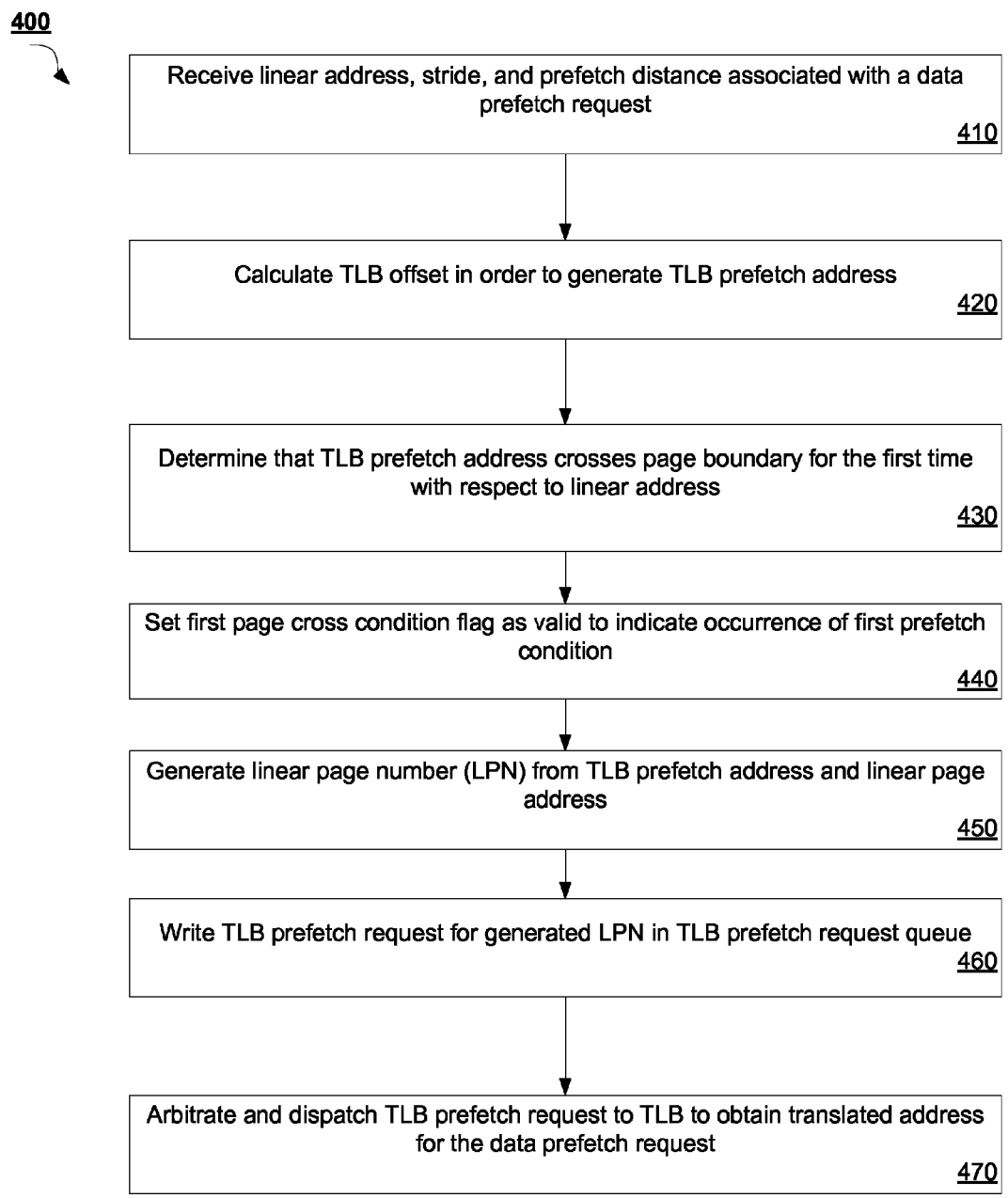
FIG. 4 is a flow diagram illustrating a method for stride-based TLB prefetching with adaptive offset according to an embodiment of the disclosure.

FIG. 4 is a flow diagram illustrating a method 400 for stride-based TLB prefetching with adaptive offset according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by TLB prefetch component 185 of FIG. 1A and/or FIG. 3.

Method 400 begins at block 410 where a linear address, stride, and prefetch distance associated with a data prefetch request are received. In one embodiment, the data prefetch request is performed by a data prefetcher of a memory unit of a processor. At block 420, a TLB offset is calculated and used to generate a TLB prefetch address. In one embodiment, the TLB prefetch address is a function of the linear address, the stride, the prefetch distance, and an adaptive offset. Then, at block 430, it is determined that the TLB prefetch address crosses a page boundary for the first time with respect to the linear address. In one embodiment, a TLB prefetch queue is examined to determine whether an entry requesting the LPN of the crossed page exists. If not, then it is assumed this is the first time the page boundary cross has occurred. In one embodiment, TLB prefetch address[12] is compared to linear address[12]. If they are different, then a page boundary cross occurs with the TLB prefetch address.

Subsequently, at block 440, a first page cross condition flag is set as valid to indicate the occurrence of a first prefetch condition. Then, at block 450, an LPN is generated using the TLB prefetch address and the linear page address. In one embodiment, the LPN is concatenated as follows: LPN[0] =tlb_prefetch_addr[12], LPN[35:1]=linear_addr[47:13]. At block 460, a TLB prefetch request is generated and written along with the generated LPN into a TLB prefetch request queue. In one embodiment, the TLB prefetch request and LPN are written when there are no previous entries in the TLB prefetch request queue requesting the same LPN translation already. Lastly, at block 470, the TLB prefetch request is arbitrated and dispatched to the TLB in order to obtain a translated LPN address for the data prefetch request.

Figure 5A:
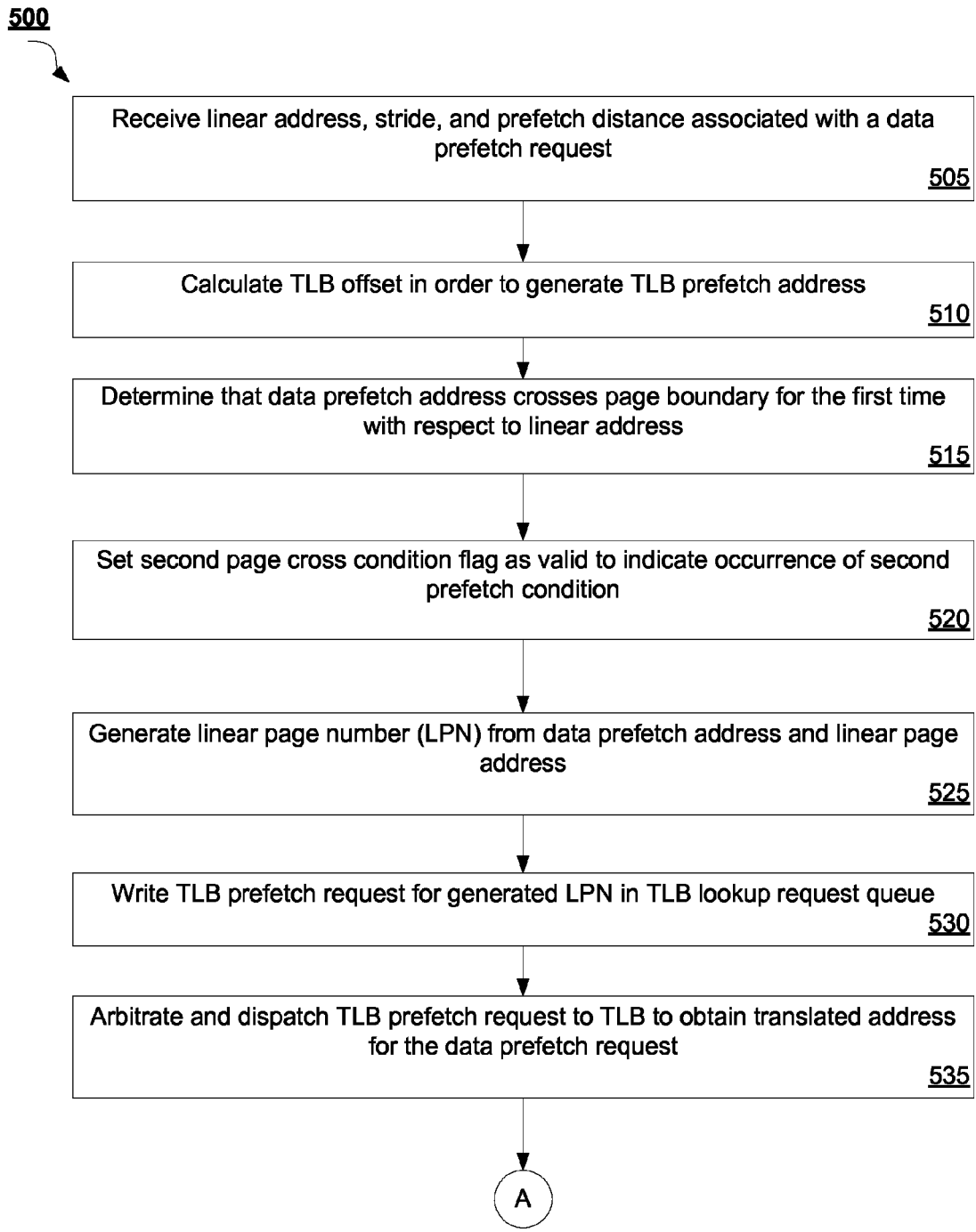
FIGS. 5A and 5B are flow diagrams illustrating another method for stride-based TLB prefetching with adaptive offset according to another embodiment of the disclosure.
Figure 5B:
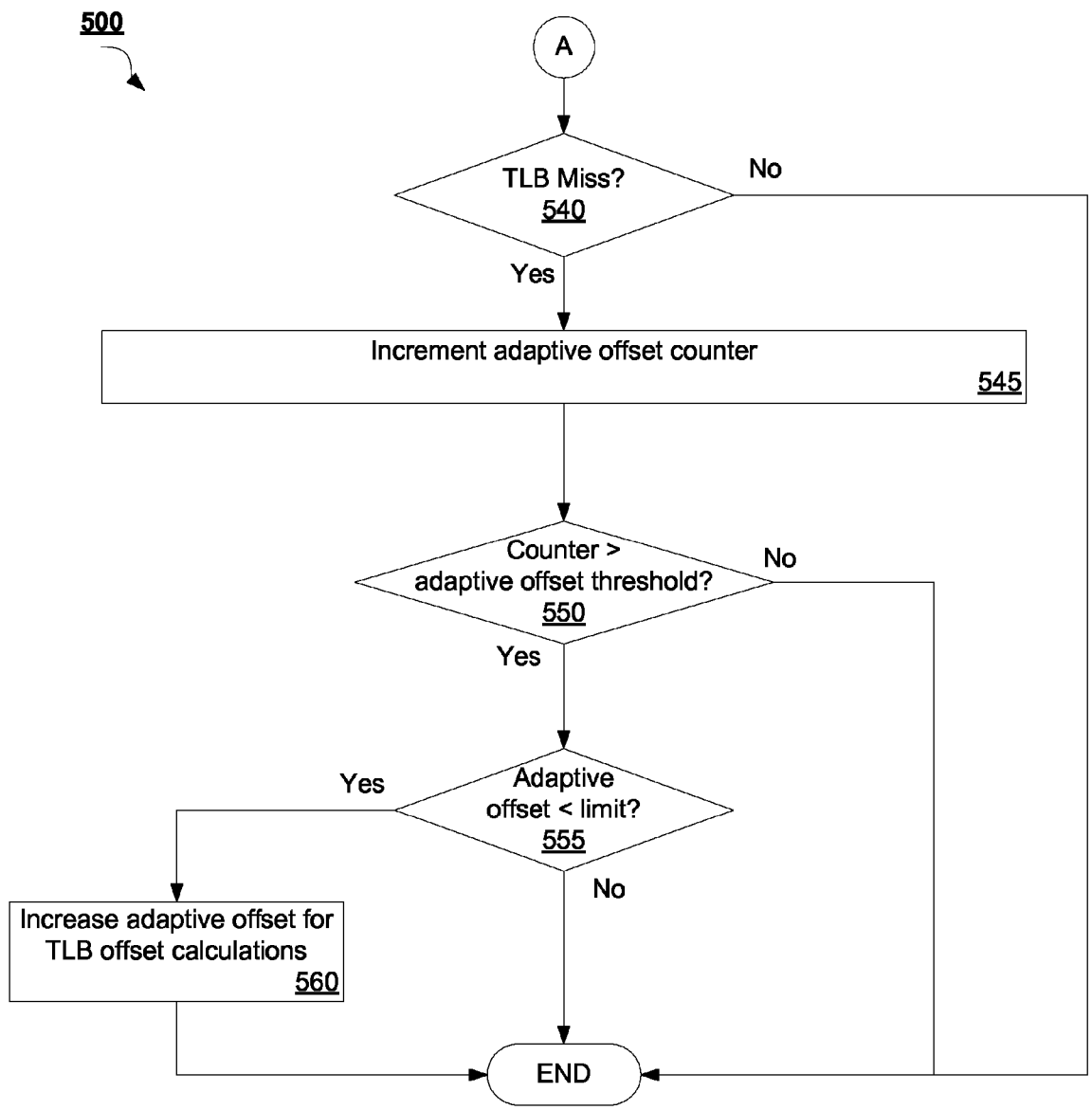

FIGS. 5A and 5B are flow diagrams illustrating another method 500 for stride-based TLB prefetching with adaptive offset according to another embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by TLB prefetch component 185 of FIG. 1 and/or FIG. 2.

Referring to FIG. 5A, method 500 begins at block 505 where a linear address, stride, and prefetch distance associated with a data prefetch request are received. In one embodiment, the data prefetch request is performed by a data prefetcher of a memory unit of a processor. At block 510, a TLB offset is calculated and used to generate a TLB prefetch address. In one embodiment, the TLB prefetch address is a function of the linear address, the stride, the prefetch distance, and an adaptive offset.

Then, at block 515, it is determined that a data prefetch address crosses a page boundary for the first time with respect to the linear address. In one embodiment, a TLB prefetch queue is examined to determine whether an entry requesting the LPN of the crossed page exists. If not, then it is assumed this is the first time the page boundary cross has occurred. In one embodiment, the data prefetch address is generated by a data prefetcher and provided to cross page boundary logic of the TLB prefetch component. For example, in the case of 4 KB memory pages, a data prefetch address[12] may be compared to linear address[12]. If they are different, then a page boundary cross occurs with the data prefetch address.

Subsequently, at block 520, a second page cross condition flag is set as valid to indicate the occurrence of a second prefetch condition. Then, at block 525, an LPN is generated using the data prefetch address and the linear page address. In one embodiment, the LPN is concatenated as follows: LPN[0]=data_prefetch_addr[12], LPN[35:1]=linear_addr[47:13]. At block 530, a TLB prefetch request is generated and written along with the generated LPN into a TLB lookup request queue. Then, at block 535, the TLB prefetch request is arbitrated and dispatched to the TLB in order to obtain a translated LPN address for the data prefetch request. In one embodiment, the TLB lookup request queue receives priority over a TLB prefetch request queue in terms of the arbitration and dispatching to the TLB.

Referring to FIG. 5B, method 500 proceeds to decision block 540, where it is determined whether a TLB miss occurred for the TLB prefetch request. If not, method 500 ends. However, if a TLB miss does occur, then method 500 continues to block 545 where an adaptive offset counter is incremented. In one embodiment, the adaptive offset counter incrementing is dependent on the occurrence of the second prefetch condition. Then, at decision block 550, it is determined whether the adaptive offset counter is greater than an adaptive offset threshold. In one embodiment, the adaptive offset threshold may be configured by a system administrator of a processing device having the TLB prefetch component.

If the counter is not greater than the threshold, then method 500 ends. On the other hand, if the counter is greater than the threshold, then method 500 proceeds to decision block 555, where it is determined whether the adaptive offset exceeds an adaptive offset limit. In one embodiment, the adaptive offset limit is also set by the system administrator. If the adaptive offset does not exceed the limit, the method 500 continues to block 560, where the adaptive offset is increased for purposes of further TLB offset calculations to generate the TLB prefetch address. If the adaptive offset does not exceed the adaptive offset limit, then method 500 ends.

Figure 6:
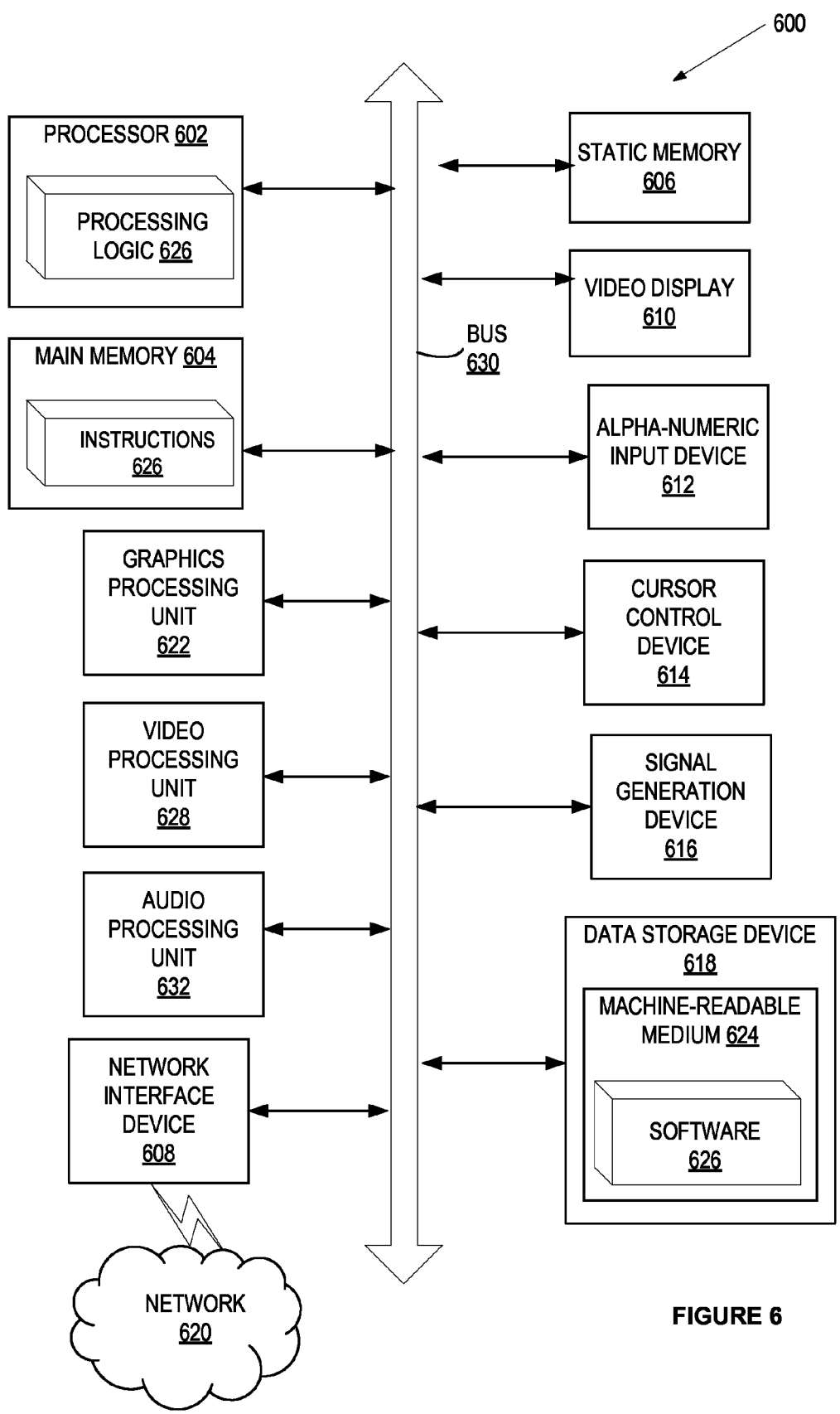
FIG. 6 illustrates a block diagram of one embodiment of a computer system in which at least one embodiment may be used.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In one embodiment, processing device 602 may include one or processing cores. The processing device 602 is configured to execute the processing logic 626 for performing the operations and steps discussed herein. In one embodiment, processing device 602 is the same as processing engine 100 described with respect to FIG. 1 that implements stride-based TLB prefetching with adaptive offset as described herein with embodiments of the disclosure.

The computer system 600 may further include a network interface device 608 communicably coupled to a network

620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). Furthermore, computer system 600 may include a graphics processing unit 622, a video processing unit 628, and an audio processing unit 632.

The data storage device 618 may include a machine-accessible storage medium 624 on which is stored software 626 implementing any one or more of the methodologies of functions described herein, such as implementing a stride-based TLB prefetching with adaptive offset as described above. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 implementing a TLB prefetch component that implements stride-based TLB prefetching with adaptive offset, such as described with respect to TLB prefetch component 138 in FIGS. 1 and 2, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

The following examples pertain to further embodiments. Example 1 is a processing device for implementing stride-based TLB prefetching with adaptive offset comprising a data prefetcher to generate a data prefetch address based on at least one of a linear address, a stride, or a prefetch distance, the data prefetch address associated with a data prefetch request, a translation lookaside buffer (TLB) prefetch address computation component communicably coupled to the data prefetcher, the TLB prefetch address computation component to generate a TLB prefetch address based on at least one of the linear address, the stride, the prefetch distance, or an adaptive offset. In Example 1, the processing device further includes a cross page detection component communicably coupled to the data prefetcher and the TLB prefetch address computation component, the cross page detection component to determine that the data prefetch address or the TLB prefetch address cross a page boundary associated with the linear address, and cause a TLB prefetch request to be written to a TLB request queue, the TLB prefetch request for translation of an address of a linear page number (LPN) that is based on at least one of the data prefetch address or the TLB prefetch address.

In Example 2, the subject matter of Example 1 can optionally include wherein the TLB prefetch request in the TLB request queue is sent to a TLB for the translation of the address. In Example 3, the subject matter of any one of Examples 1-2 can optionally include wherein the TLB request queue further comprises a TLB prefetch request queue and a TLB lookup request queue.

In Example 4, the subject matter of any one of Examples 1-3 can optionally include wherein the TLB prefetch request queue to store one or more TLB prefetch requests for LPNs generated based on the TLB prefetch address. In Example 5, the subject matter of any one of Examples 1-4 can optionally include wherein the TLB lookup request queue to store one or more TLB prefetch requests for LPNs generated based on the data prefetch address.

In Example 6, the subject matter of any one of Examples 1-5 can optionally include wherein when the TLB prefetch address is determined to cross the page boundary, the cross page detection component further to set a first cross page flag to indicate occurrence of a first prefetch condition. In Example 7, the subject matter of any one of Examples 1-6 can optionally include wherein when the first cross page flag is set to indicate the occurrence of the first prefetch condition, the TLB prefetch address is concatenated with the linear page address to generate the LPN for the TLB prefetch request. In Example 8, the subject matter of any one of Examples 1-7 can optionally include wherein when the data prefetch address is determined to cross the page boundary, the cross page detection component further to set a second cross page flag to indicate occurrence of a second prefetch condition.

In Example 9, the subject matter of any one of Examples 1-8 can optionally include wherein when the second cross page flag is set to indicate the occurrence of the second prefetch condition, the data prefetch address is concatenated with the linear page address to generate the LPN for the TLB prefetch request. In Example 10, the subject matter of any one of Examples 1-9 can optionally include wherein when the second prefetch condition occurs, the cross page detection component to increment an adaptive offset counter. In Example 11, the subject matter of any one of Examples 1-10 can optionally include wherein when the adaptive offset counter exceeds an adaptive offset counter threshold and when a value of the adaptive offset is less than an adaptive offset limit, the adaptive offset is increased. All optional features of the apparatus described above may also be implemented with respect to the method or process described herein Example 12 is a method for implementing stride-based TLB prefetching with adaptive offset comprising receiving, by a translation lookaside buffer (TLB) prefetch component of a processing device, a data prefetch address based on at least one of a linear address, a stride, or a prefetch distance, the data prefetch address associated with a data prefetch request, generating a TLB prefetch address based on at least one of the linear address, the stride, the prefetch distance, or an adaptive offset, determining that the data prefetch address or the TLB prefetch address cross a page boundary associated with the linear address, and writing a TLB prefetch request to a TLB request queue, the TLB prefetch request for translation of an address of a linear page number (LPN) that is based on at least one of the data prefetch address or the TLB prefetch address.

In Example 13, the subject matter of Examples 12 can optionally include further comprising sending the TLB prefetch request in the TLB request queue is sent to a TLB for the translation of the address. In Example 14, the subject matter of any one of Examples 12-13 can optionally include wherein the TLB request queue further comprises a TLB prefetch request queue to store one or more TLB prefetch requests for LPNs generated based on the TLB prefetch, and a TLB lookup request queue to store one or more TLB prefetch requests for LPNs generated based on the data prefetch address.

In Example 15, the subject matter of any one of Examples 12-14 can optionally include further comprising when the TLB prefetch address is determined to cross the page boundary, setting a first cross page flag to indicate occurrence of a first prefetch condition. In Example 16, the subject matter of any one of Examples 12-15 can optionally include further comprising when the first cross page flag is set to indicate the occurrence of the first prefetch condition, concatenating the TLB prefetch address with the linear page address to generate the LPN for the TLB prefetch request. In Example 17, the subject matter of any one of Examples 12-16 can optionally include further comprising when the data prefetch address is determined to cross the page boundary, setting a second cross page flag to indicate occurrence of a second prefetch condition.

In Example 18, the subject matter of any one of Examples 12-17 can optionally include further comprising when the second cross page flag is set to indicate the occurrence of the second prefetch condition, concatenating the data prefetch address with the linear page address to generate the LPN for the TLB prefetch request. In Example 19, the subject matter of any one of Examples 12-18 can optionally include further comprising when the second prefetch condition occurs, incrementing an adaptive offset counter. In Example 20, the subject matter of any one of Examples 12-19 can optionally include wherein when the adaptive offset counter exceeds an adaptive offset counter threshold and when a value of the adaptive offset is less than an adaptive offset limit, increasing the adaptive offset.

Example 21 is a system for implementing stride-based TLB prefetching with adaptive offset. In Example 21 the system includes a memory and a processing device communicably coupled to the memory, the processing device comprising a translation-lookaside buffer (TLB) prefetch component to receive a data prefetch address based on at least one of a linear address, a stride, or a prefetch distance, the data prefetch address associated with a data prefetch request, generate a TLB prefetch address based on at least one of the linear address, the stride, the prefetch distance, or an adaptive offset, determine that the data prefetch address or the TLB prefetch address cross a page boundary associated with the linear address, and send a TLB prefetch to a TLB of the processing device, the TLB prefetch request for translation of an address of a linear page number (LPN) that is based on at least one of the data prefetch address or the TLB prefetch address.

In Example 22, the subject matter of Example 21 can optionally include wherein the TLB request is sent from a TLB request queue that comprises a TLB prefetch request queue to store one or more TLB prefetch requests for LPNs generated based on the TLB prefetch, and a TLB lookup request queue to store one or more TLB prefetch requests for LPNs generated based on the data prefetch address. In Example 23, the subject matter of any one of Examples 21-22 can optionally include further comprising when the TLB prefetch address is determined to cross the page boundary, the processing device to set a first cross page flag to indicate occurrence of a first prefetch condition. In Example 24, the subject matter of any one of Examples 21-23 can optionally include further comprising when the first cross page flag is set to indicate the occurrence of the first prefetch condition, the processing device to concatenate the TLB prefetch address with the linear page address to generate the LPN for the TLB prefetch request.

In Example 25, the subject matter of any one of Examples 21-24 can optionally include further comprising when the data prefetch address is determined to cross the page boundary, the processing device to set a second cross page flag to indicate occurrence of a second prefetch condition. In Example 26, the subject matter of any one of Examples 21-25 can optionally include further comprising when the second cross page flag is set to indicate the occurrence of the second prefetch condition, the processing device to concatenate the data prefetch address with the linear page address to generate the LPN for the TLB prefetch request.

In Example 27, the subject matter of any one of Examples 21-26 can optionally include further comprising when the second prefetch condition occurs, the processing device to increment an adaptive offset counter. In Example 28, the subject matter of any one of Examples 21-27 can optionally include wherein when the adaptive offset counter exceeds an adaptive offset counter threshold and when a value of the adaptive offset is less than an adaptive offset limit, the processing device to increase the adaptive offset. All optional features of the system described above may also be implemented with respect to the method or process described herein.

Example 29 is non-transitory computer-readable medium for implementing stride-based TLB prefetching with adaptive offset. In Example 29, the non-transitory machine-readable medium includes data that, when accessed by a processing device, cause the processing device to perform operations comprising receiving, by a translation lookaside buffer (TLB) prefetch component of a processing device, a data prefetch address based on at least one of a linear address, a stride, or a prefetch distance, the data prefetch address associated with a data prefetch request, generating a TLB prefetch address based on at least one of the linear address, the stride, the prefetch distance, or an adaptive offset, determining that the data prefetch address or the TLB prefetch address cross a page boundary associated with the linear address, and writing a TLB prefetch request to a TLB request queue, the TLB prefetch request for translation of an address of a linear page number (LPN) that is based on at least one of the data prefetch address or the TLB prefetch address.

In Example 30, the subject matter of Example 29 can optionally include further comprising sending the TLB prefetch request in the TLB request queue is sent to a TLB for the translation of the address. In Example 31, the subject matter of any one of Examples 29-30 can optionally include wherein the TLB request queue further comprises a TLB prefetch request queue to store one or more TLB prefetch requests for LPNs generated based on the TLB prefetch, and a TLB lookup request queue to store one or more TLB prefetch requests for LPNs generated based on the data prefetch address.

In Example 32, the subject matter of any one of Examples 29-31 can optionally include further comprising when the TLB prefetch address is determined to cross the page boundary, setting a first cross page flag to indicate occurrence of a first prefetch condition. In Example 33, the subject matter of any one of Examples 29-32 can optionally include further comprising when the first cross page flag is set to indicate the occurrence of the first prefetch condition, concatenating the TLB prefetch address with the linear page address to generate the LPN for the TLB prefetch request. In Example 34, the subject matter of any one of Examples 29-33 can optionally include further comprising when the data prefetch address is determined to cross the page boundary, setting a second cross page flag to indicate occurrence of a second prefetch condition.

In Example 35, the subject matter of any one of Examples 29-34 can optionally include further comprising when the second cross page flag is set to indicate the occurrence of the second prefetch condition, concatenating the data prefetch address with the linear page address to generate the LPN for the TLB prefetch request. In Example 36, the subject matter of any one of Examples 29-35 can optionally include further comprising when the second prefetch condition occurs, incrementing an adaptive offset counter. In Example 37, the subject matter of any one of Examples 29-36 can optionally include wherein when the adaptive offset counter exceeds an adaptive offset counter threshold and when a value of the adaptive offset is less than an adaptive offset limit, increasing the adaptive offset.

Example 38 is an apparatus for implementing stride-based TLB prefetching with adaptive offset comprising means for receiving a data prefetch address based on at least one of a linear address, a stride, or a prefetch distance, the data prefetch address associated with a data prefetch request, means for generating a translation lookaside buffer (TLB) prefetch address based on at least one of the linear address, the stride, the prefetch distance, or an adaptive offset, means for determining that the data prefetch address or the TLB prefetch address cross a page boundary associated with the linear address, and means for writing a TLB prefetch request to a TLB request queue, the TLB prefetch request for translation of an address of a linear page number (LPN) that is based on at least one of the data prefetch address or the TLB prefetch address. In Example 39, the subject matter of Example 38 can optionally include the apparatus further configured to perform the method of any one of the Examples 13 to 20.

Example 40 is at least one machine readable medium comprising a plurality of instructions that in response to being executed on a computing device, cause the computing device to carry out a method according to any one of Examples 12-20. Example 41 is an apparatus for implementing stride-based TLB prefetching with adaptive offset, configured to perform the method of any one of Examples 12-20. Example 42 is an apparatus comprising means for performing the method of any one of Examples 12-20. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
    a data prefetcher to generate a data prefetch address based on at least one of a linear address, a stride, or a prefetch distance, the data prefetch address associated with a data prefetch request;
    a translation lookaside buffer (TLB) prefetch address computation component communicably coupled to the data prefetcher, the TLB prefetch address computation component to generate a TLB prefetch address based on at least one of the linear address, the stride, the prefetch distance, or an adaptive offset; and
    a cross page detection component communicably coupled to the data prefetcher and the TLB prefetch address computation component, the cross page detection component to:
        determine that the data prefetch address or the TLB prefetch address cross a page boundary associated with the linear address; and
        cause a TLB prefetch request to be written to a TLB request queue based on determining that the data prefetch address or the TLB prefetch address cross the page boundary associated with the linear address, the TLB prefetch request for translation of an address of a linear page number (LPN) that is based on at least one of the data prefetch address or the TLB prefetch address.

2. The processing device of claim 1, wherein the TLB prefetch request in the TLB request queue is sent to a TLB for the translation of the address.

3. The processing device of claim 1, wherein the TLB request queue further comprises a TLB prefetch request queue and a TLB lookup request queue;
    wherein the TLB prefetch request queue to store one or more TLB prefetch requests for LPNs generated based on the TLB prefetch address; and
    wherein the TLB lookup request queue to store one or more TLB prefetch requests for LPNs generated based on the data prefetch address.

4. The processing device of claim 1, wherein when the TLB prefetch address is determined to cross the page boundary, the cross page detection component further to set a first cross page flag to indicate occurrence of a first prefetch condition.

5. The processing device of claim 4, wherein when the first cross page flag is set to indicate the occurrence of the first prefetch condition, the TLB prefetch address is concatenated with the linear page address to generate the LPN for the TLB prefetch request.

6. The processing device of claim 1, wherein when the data prefetch address is determined to cross the page boundary, the cross page detection component further to set a second cross page flag to indicate occurrence of a second prefetch condition.

7. The processing device of claim 6, wherein when the second cross page flag is set to indicate the occurrence of the second prefetch condition, the data prefetch address is concatenated with the linear page address to generate the LPN for the TLB prefetch request.

8. The processing device of claim 6, wherein when the second prefetch condition occurs, the cross page detection component to increment an adaptive offset counter.

9. The processing device of claim 8, wherein when the adaptive offset counter exceeds an adaptive offset counter threshold and when a value of the adaptive offset is less than an adaptive offset limit, the adaptive offset is increased.

10. A method, comprising:
   receiving, by a translation lookaside buffer (TLB) prefetch component of a processing device, a data prefetch address based on at least one of a linear address, a stride, or a prefetch distance, the data prefetch address associated with a data prefetch request;
   generating a TLB prefetch address based on at least one of the linear address, the stride, the prefetch distance, or an adaptive offset;
   determining that the data prefetch address or the TLB prefetch address cross a page boundary associated with the linear address; and
   writing a TLB prefetch request to a TLB request queue based on determining that the data prefetch address or the TLB prefetch address cross the page boundary associated with the linear address, the TLB prefetch request for translation of an address of a linear page number (LPN) that is based on at least one of the data prefetch address or the TLB prefetch address.

11. The method of claim 10, further comprising, sending the TLB prefetch request in the TLB request queue is sent to a TLB for the translation of the address.

12. The method of claim 10, wherein the TLB request queue further comprises:
   a TLB prefetch request queue to store one or more TLB prefetch requests for LPNs generated based on the TLB prefetch; and
   a TLB lookup request queue to store one or more TLB prefetch requests for LPNs generated based on the data prefetch address.

13. The method of claim 10, further comprising when the TLB prefetch address is determined to cross the page boundary, setting a first cross page flag to indicate occurrence of a first prefetch condition.

14. The method of claim 13, further comprising when the first cross page flag is set to indicate the occurrence of the first prefetch condition, concatenating the TLB prefetch address with the linear page address to generate the LPN for the TLB prefetch request.

15. The method of claim 10, further comprising when the data prefetch address is determined to cross the page boundary, setting a second cross page flag to indicate occurrence of a second prefetch condition.

16. The method of claim 15, further comprising when the second cross page flag is set to indicate the occurrence of the second prefetch condition, concatenating the data prefetch address with the linear page address to generate the LPN for the TLB prefetch request.

17. The method of claim 15, further comprising when the second prefetch condition occurs, incrementing an adaptive offset counter.

18. The method of claim 17, wherein when the adaptive offset counter exceeds an adaptive offset counter threshold and when a value of the adaptive offset is less than an adaptive offset limit, increasing the adaptive offset.

19. An system comprising:
   a memory;
   a processing device communicably coupled to the memory, the processing device comprising a translation-lookaside buffer (TLB) prefetch component to:
      receive a data prefetch address based on at least one of a linear address, a stride, or a prefetch distance, the data prefetch address associated with a data prefetch request;
      generate a TLB prefetch address based on at least one of the linear address, the stride, the prefetch distance, or an adaptive offset;
      determine that the data prefetch address or the TLB prefetch address cross a page boundary associated with the linear address; and
      send a TLB prefetch to a TLB of the processing device based on determining that the data prefetch address or the TLB prefetch address cross the page boundary associated with the linear address, the TLB prefetch request for translation of an address of a linear page number (LPN) that is based on at least one of the data prefetch address or the TLB prefetch address.

20. The system of claim 19, wherein the TLB request is sent from a TLB request queue that comprises:
   a TLB prefetch request queue to store one or more TLB prefetch requests for LPNs generated based on the TLB prefetch; and
   a TLB lookup request queue to store one or more TLB prefetch requests for LPNs generated based on the data prefetch address.

21. The system of claim 19, further comprising when the TLB prefetch address is determined to cross the page boundary, the processing device to set a first cross page flag to indicate occurrence of a first prefetch condition.

22. The system of claim 21, further comprising when the first cross page flag is set to indicate the occurrence of the first prefetch condition, the processing device to concatenate the TLB prefetch address with the linear page address to generate the LPN for the TLB prefetch request.

23. The system of claim 19, further comprising when the data prefetch address is determined to cross the page boundary, the processing device to set a second cross page flag to indicate occurrence of a second prefetch condition.

24. The system of claim 23, further comprising when the second cross page flag is set to indicate the occurrence of the second prefetch condition, the processing device to concatenate the data prefetch address with the linear page address to generate the LPN for the TLB prefetch request.

* * * * *